Nov. 7, 1961  L. T. GALESKY  3,007,282
SEMI-ARTIFICIAL TREE WITH WATER SUPPLY
Filed May 5, 1959
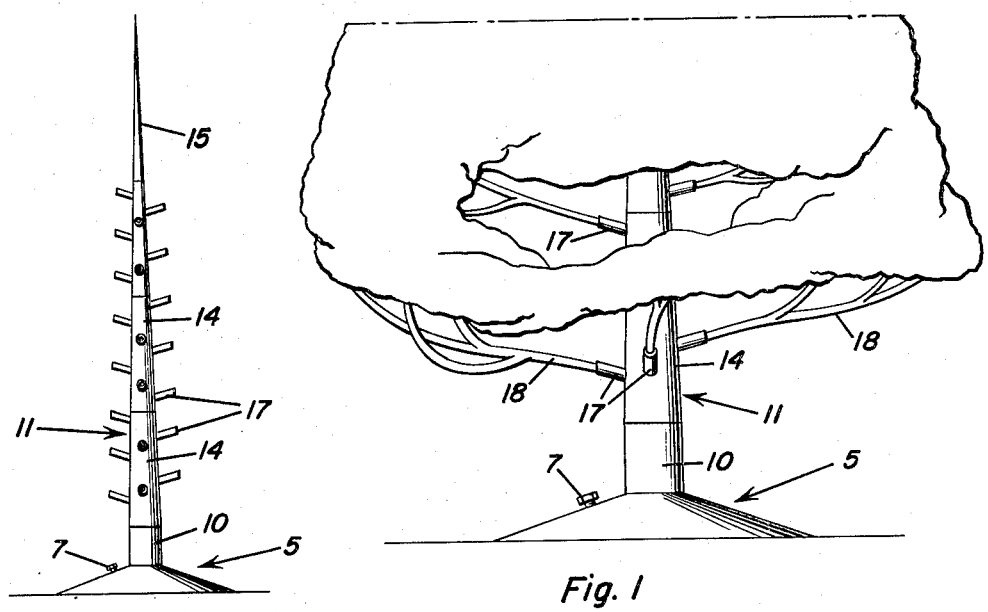
Fig. 1
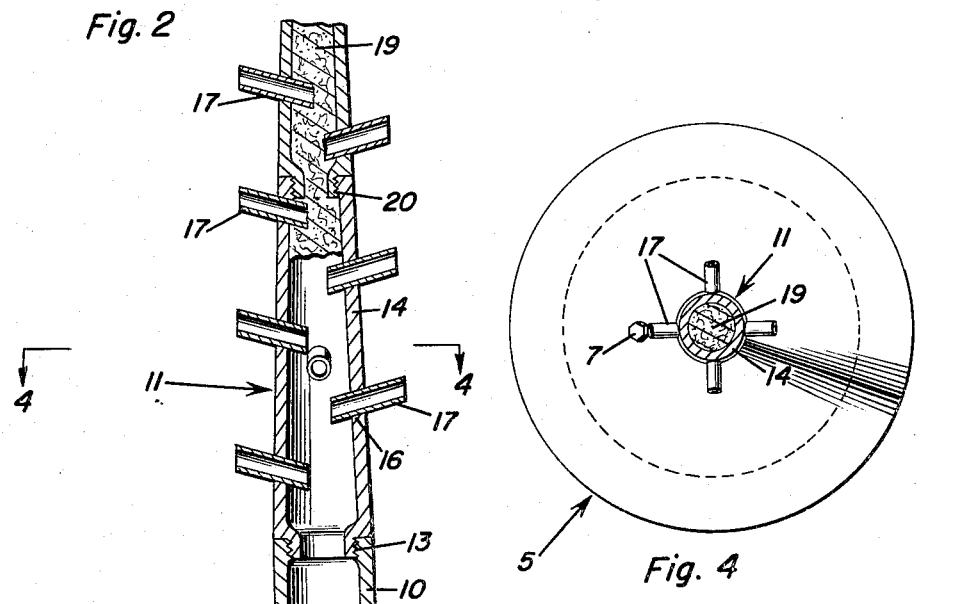
Fig. 2
Fig. 3
Fig. 4
Leonard T. Galesky
INVENTOR.
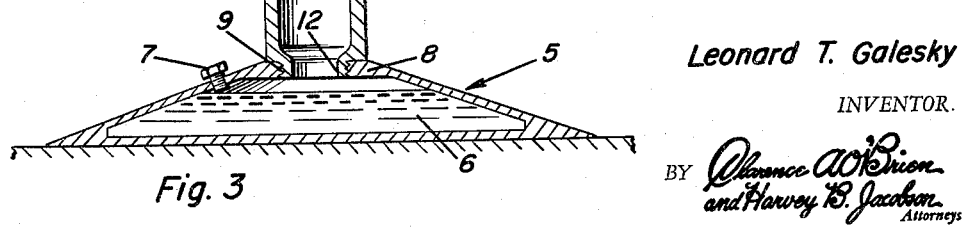

United States Patent Office 3,007,282
Patented Nov. 7, 1961

3,007,282
SEMI-ARTIFICIAL TREE WITH WATER SUPPLY
Leonard T. Galesky, Stamford, Conn.
(39 Moshier St., Greenwich, Conn.)
Filed May 5, 1959, Ser. No. 811,169
5 Claims. (Cl. 47—41)

This invention relates to new and useful improvements in semi-artificial trees to be used particularly although not necessarily, during the Christmas season and has for its primary object to provide, in a manner as hereinafter set forth, a device of this character which utilizes natural tree branches or limbs, whereby a highly attractive, life-like appearance is ensured.

Another very important object of the present invention is to provide a semi-artificial tree of the aforementioned character comprising novel means for watering the branches, thus maintaining the appearance and greatly prolonging the life thereof.

Still another important object of the invention is to provide a semi-artificial tree of the character described which is adapted to be expeditiously knocked down or taken apart for compact storage when it is not in use.

Other objects of the invention are to provide a sectional, semi-artificial tree which will be of relatively simple construction, strong and durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the lower portion of a semi-artificial tree embodying the present invention;

FIGURE 2 is an elevational view of the device without the branches;

FIGURE 3 is a fragmentary view in vertical section through the lower portion of the device without the branches; and FIGURE 4 is a view in horizontal section, taken substantially on the line 4—4 of FIGURE 3.

Referring now to the drawing in detail, it will be seen that the embodiment of the invention which has been illustrated comprises a hollow, substantially frusto-conical base of suitable dimensions and material which is designated generally by reference character 5. The base 5 is for the reception of water, as indicated at 6. Toward this end, the base 5 is provided with a filler plug 7. The top 8 of the base 5 has formed therein a centrally located threaded opening 9.

Removably mounted through the medium of an adapter 10 on the base 5 is a sectional, upwardly tapered, tubular standard or trunk, also of suitable dimensions and material, which is designated generally by reference character 11. The adapter 10 includes a reduced, externally threaded lower end portion 12 which is screwed into the opening 9 in the base 5 for removably mounting said adapter thereon. The upper end portion of the adapter 10 is internally threaded, as indicated at 13.

The trunk 11 includes a plurality of separable, threadedly connected branch supporting sections 14 which are open at both ends for communication with each other. Of course, the trunk 11 communicates with the hollow base 5 for receiving water therefrom through the adapter 10. The trunk 11 further includes a closed conical tip 15.

Fixed in openings 16 which are provided therefor at suitable spaced points in the sections 14 of the trunk 11 is a multiplicity of downwardly and inwardly inclined sleeves or tubes 17 constituting holders for the reception of the inner or butt end portions of natural tree branches 18. It is to be noted that the tubular branch holders 17 are open at both ends. The trunk 11 encloses a filler 19 of a suitable absorbent material constituting what may be considered a wick extending downwardly into the base 5 for receiving water therefrom. The threaded connections of the separable trunk sections are indicated at 20.

It is thought that the use of the invention will be readily apparent from a consideration of the foregoing. Briefly, the trunk 11 is assembled and mounted on the base 5 through the medium of the adapter 10. The plug 7 is removed, the base 5 is filled to the desired level with water and said plug is replaced. The natural branches 18 are then inserted in the tubular holders 17 and project into the trunk 11. The wick 19 feeds the water 6 from the base 5 to the branches 18 by capillary attraction in an obvious manner. Thus, the life of the branches 18 is materially prolonged. Preferably, the tubular holders 17 progressively decrease in diameter from the bottom to the top of the tree to conform to the usual corresponding decrease in the size of the branches 18 from the lowermost to the uppermost thereof. Of course, to dismantle the tree the foregoing procedure is substantially reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A semi-artificial tree comprising a base, a trunk mounted on said base, means for mounting a plurality of natural tree branches on said trunk and means for watering said branches, said trunk comprising a plurality of aligned cylindrical trunk sections open at both ends, means removably securing adjacent ends of said trunk sections together, said mounting means including a plurality of open ended tubular laterally projecting branch holders through the walls of each of said hollow cylindrical trunk sections and projecting into the interior of said trunk sections, said watering means including a fibrous filler material substantially filling each of said trunk sections, said base comprising a closure for the lowermost end of the bottom trunk section.

2. The combination of claim 1 wherein the inside surfaces of each of said trunk sections are upwardly tapered, the lowermost ends of the inside surfaces of each of said trunk sections being diametrically reduced relative to the inside surfaces of said sections disposed immediately thereabove.

3. The combination of claim 1 wherein said base is hollow and the interior thereof is sealingly communicated with the interior of the lowermost trunk section.

4. The combination of claim 3 wherein said base is provided with a filler opening for the reception of water and a removable plug for said opening.

5. In a semi-artificial tree, the combination of a hollow base constituting a receptacle for water, a vertically elongated hollow trunk mounted on said base and having its lower end in communication with the interior of the base, said trunk being provided with a plurality of lateral openings, a plurality of open-ended tubular members secured intermediate their ends in the respective openings of the trunk and projecting both inwardly and outwardly of the trunk, and an absorbent wick completely filling the interior of the trunk and extending into said base for absorption of water in said receptacle whereby the entire wick may be kept moist by capillary action, said wick surrounding the inner ends of said tubular members and the latter being adapted to receive therein natural tree brances with the inner ends of the branches engaging said wick to be moistened thereby.

References Cited in the file of this patent

UNITED STATES PATENTS

| | | |
|---|---|---|
| 262,335 | Wagner | Aug. 8, 1882 |
| 1,266,749 | Abbott | May 21, 1918 |
| 2,186,351 | Stojaneck | Jan. 9, 1940 |
| 2,577,320 | Fenyo | Dec. 4, 1951 |
| 2,659,180 | Acton | Nov. 17, 1953 |
| 2,695,474 | Barstow | Nov. 30, 1954 |
| 2,807,901 | Gilowitz | Oct. 1, 1957 |
| 2,810,235 | Magid | Oct. 22, 1957 |